(12) United States Patent
Hower et al.

(10) Patent No.: US 9,697,126 B2
(45) Date of Patent: Jul. 4, 2017

(54) GENERATING APPROXIMATE USAGE MEASUREMENTS FOR SHARED CACHE MEMORY SYSTEMS

(71) Applicant: QUALCOMM Incorporated, San Diego, CA (US)

(72) Inventors: Derek Robert Hower, Durham, NC (US); Harold Wade Cain, III, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/860,993

(22) Filed: Sep. 22, 2015

(65) Prior Publication Data
US 2016/0147655 A1 May 26, 2016

Related U.S. Application Data

(60) Provisional application No. 62/084,469, filed on Nov. 25, 2014.

(51) Int. Cl.
*G06F 12/08* (2016.01)
*G06F 11/34* (2006.01)
(Continued)

(52) U.S. Cl.
CPC ........ *G06F 12/084* (2013.01); *G06F 11/3466* (2013.01); *G06F 11/3471* (2013.01);
(Continued)

(58) Field of Classification Search
CPC .............. G06F 12/084; G06F 12/0846; G06F 12/0848; G06F 12/0864; G06F 12/0895;
(Continued)

(56) References Cited

U.S. PATENT DOCUMENTS 8,296,522 B2    10/2012   Harikumar et al.
8,458,399 B2     6/2013   Humlicek et al.
(Continued)

OTHER PUBLICATIONS

Iyer, Ravi, "CQoS: A Framework for Enabling QoS in Shared Caches of CMP Platforms," ICS '04, Jun. 26-Jul. 1, 2004, Saint-Malo, France, pp. 257-266.
Ye, Ying et al., "COLORIS: A Dynamic Cache Partitioning System Using Page Coloring," PACT '14 Proceedings of be 23rd International Conference on Parallel architectures and compilation, 2014, ACM, pp. 381-392, Aug. 24, 2014.
(Continued)

*Primary Examiner* — Aracelis Ruiz
(74) *Attorney, Agent, or Firm* — W&T/Qualcomm (57) ABSTRACT

Generating approximate usage measurements for shared cache memory systems is disclosed. In one aspect, a cache memory system is provided. The cache memory system comprises a shared cache memory system. A subset of the shared cache memory system comprises a Quality of Service identifier (QoSID) tracking tag configured to store a QoSID tracking indicator for a QoS class. The shared cache memory system further comprises a cache controller configured to receive a memory access request comprising a QoSID, and is configured to access a cache line corresponding to the memory access request. The cache controller is also configured to determine whether the QoSID of the memory access request corresponds to a cache line assigned to the QoSID. If so, the cache controller is additionally configured to update the QoSID tracking tag.

20 Claims, 8 Drawing Sheets

(51) Int. Cl.
*G06F 12/084* (2016.01)
*G06F 12/0846* (2016.01)
*G06F 12/0864* (2016.01)
*G06F 12/0895* (2016.01)

(52) U.S. Cl.
CPC ...... *G06F 12/0846* (2013.01); *G06F 12/0848* (2013.01); *G06F 11/348* (2013.01); *G06F 12/0864* (2013.01); *G06F 12/0895* (2013.01); *G06F 2201/88* (2013.01); *G06F 2201/885* (2013.01); *G06F 2212/1016* (2013.01); *G06F 2212/1044* (2013.01); *G06F 2212/2112* (2013.01); *G06F 2212/282* (2013.01); *G06F 2212/314* (2013.01); *Y02B 60/1225* (2013.01)

(58) Field of Classification Search
CPC ............ G06F 11/3466; G06F 11/3471; G06F 11/348; G06F 2201/88; G06F 2201/885; G06F 2212/1016; G06F 2212/1044; G06F 2212/2112; G06F 2212/282; G06F 2212/314
See application file for complete search history.

(56) References Cited

U.S. PATENT DOCUMENTS

| | | |
|---|---|---|
| 8,667,493 B2 | 3/2014 | Chung et al. |
| 8,751,746 B2 | 6/2014 | Lilly |
| 2008/0235457 A1* | 9/2008 | Hasenplaugh ...... G06F 12/0842 711/130 |
| 2009/0164730 A1* | 6/2009 | Harikumar ............ G06F 12/084 711/129 |
| 2013/0138889 A1 | 5/2013 | Chockler et al. |
| 2014/0095691 A1 | 4/2014 | Ganguli et al. |

OTHER PUBLICATIONS

Zhao, Li et al., "CacheScouts: Fine-Grain Monitoring of Shared Caches in CMP Platforms," 16th International Conference on Parallel Architecture and Compilation Techniques, IEEE Computer Society, 2007, pp. 339-349, Sep. 15-19, 2007.
International Search Report and Written Opinion for PCT/US2015/059685, mailed Feb. 4, 2016, 14 pages.
International Preliminary Report on Patentability for PCT/US2015/059685, mailed Dec. 2, 2016, 19 pages.

* cited by examiner

FIG. 4

GENERATING APPROXIMATE USAGE MEASUREMENTS FOR SHARED CACHE MEMORY SYSTEMS

PRIORITY CLAIM

The present application claims priority under 35 U.S.C. §119(e) to U.S. Provisional Patent Application Ser. No. 62/084,469 filed on Nov. 25, 2014, and entitled "GENERATING APPROXIMATE USAGE MEASUREMENTS FOR SHARED CACHE MEMORY, AND RELATED METHODS AND SYSTEMS," the contents of which is incorporated herein by reference in its entirety.

BACKGROUND

I. Field of the Disclosure

The technology of the disclosure relates generally to shared cache memory systems, and, in particular, to measuring usage of shared caches.

II. Background

An increasing number of computer hardware units (e.g., central processing units (CPUs), graphics processing units (GPUs), digital signal processing (DSP) units, and/or direct memory access (DMA) engines, as non-limiting examples) are configured to share memory system resources such as caches, memory, interconnect bandwidth, and cache bandwidth. Resource interference and conflicts between computer hardware units could result in negative consequences, such as missing a real-time deadline on a mobile System-on-Chip (SoC), or violating a Service Level Agreement (SLA) on a consolidated server, as non-limiting examples. Additionally, reference streams associated with some computer hardware units may have little temporal locality, leading to cache pollution and a negative impact on overall performance if left unchecked. Accordingly, monitoring the effects of resource sharing has become more important to achieving optimal system performance. In this regard, it may be desirable for users to have the ability to monitor the usage of shared resources.

However, conventional cache memory systems do not provide a space-efficient mechanism for monitoring cache usage. As a result, such conventional cache memory systems may remain underutilized to protect against worst case performance in the presence of cache interference. Moreover, a lack of feedback regarding cache occupancy may result in computer processing systems being unable to provide optimal scheduling of system tasks.

SUMMARY OF THE DISCLOSURE

Aspects disclosed in the detailed description include generating approximate usage measurements for shared cache memory systems. In this regard, in one aspect, a shared cache memory system is provided. The shared cache memory system is configured to approximate cache usage for each of a plurality of Quality of Service (QoS) classes, each QoS class having an associated QoS identifier (QoSID). The shared cache memory system includes a plurality of cache lines that are subdivided into a plurality of cache subdivisions. According to some aspects disclosed herein, the plurality of cache subdivisions may comprise individual cache lines, sets of cache lines, and/or banks of cache lines, as non-limiting examples. The plurality of cache subdivisions are each associated with one of the plurality of QoS classes for which cache usage is to be approximated. The shared cache memory system also provides a plurality of QoSID tracking tags corresponding to the plurality of cache subdivisions. Upon receiving a memory access request comprising a QoSID, a cache usage monitor of the shared cache memory system is further configured to access a cache subdivision corresponding to the memory access request. The cache usage monitor is configured to determine whether the QoSID of the memory access request corresponds to a QoS class associated with the cache subdivision. Based on this determination, the cache usage monitor updates a QoSID tracking tag associated with the cache subdivision corresponding to the memory access request. In this manner, the plurality of QoSID tracking tags may be maintained to indicate whether a QoS class associated with each cache subdivision is actually using that cache subdivision at a given time.

The cache usage monitor is further configured to generate an approximate usage measurement for a QoS class of the plurality of QoS classes based on the plurality of QoSID tracking tags. By trading off accuracy of the cache usage measurement for a reduction in storage overhead for the plurality of QoSID tracking tags, the shared cache memory system may provide sufficient usage measurement data for managing cache allocation, while minimizing impacts on processor performance and power consumption.

In another aspect, a shared cache memory system is provided. The shared cache memory system comprises a plurality of cache subdivisions. The shared cache memory system further comprises a plurality of QoSID tracking tags each associated with a cache subdivision of the plurality of cache subdivisions. The shared cache memory system also comprises a cache usage monitor. The cache usage monitor is configured to associate each cache subdivision of the plurality of cache subdivisions with a QoS class of a plurality of QoS classes. The cache usage monitor is further configured to receive a memory access request comprising a QoSID. The cache usage monitor is also configured to access a cache subdivision corresponding to the memory access request among the plurality of cache subdivisions. The cache usage monitor is additionally configured to determine whether the QoSID of the memory access request corresponds to the QoS class associated with the cache subdivision. The cache usage monitor is further configured to update a QoSID tracking tag plurality of QoSID tracking tags associated with the cache subdivision corresponding to the memory access request based on the determination. The cache usage monitor is also configured to generate an approximate usage measurement for the QoS class of the plurality of QoS classes based on the plurality of QoSID tracking tags.

In another aspect, a shared cache memory system is provided. The shared cache memory system comprises a means for associating each cache subdivision of a plurality of cache subdivisions of the shared cache memory system with a QoS class of a plurality of QoS classes. The shared cache memory system further comprises a means for receiving a memory access request comprising a QoSID. The shared cache memory system also comprises a means for accessing a cache subdivision corresponding to the memory access request among the plurality of cache subdivisions. The shared cache memory system additionally comprises a means for determining whether the QoSID of the memory access request corresponds to the QoS class plurality of QoS classes associated with the cache subdivision. The shared cache memory system further comprises a means for updating a QoSID tracking tag of a plurality of QoSID tracking tags associated with the cache subdivision corresponding to the memory access request based on the means for determining. The shared cache memory system also comprises a means for generating an approximate usage measurement for the QoS class of the plurality of QoS classes based on the plurality of QoSID tracking tags.

In another aspect, a method for approximating shared cache memory usage is provided. The method comprises associating each cache subdivision of a plurality of cache subdivisions of a shared cache memory system with a QoS class of a plurality of QoS classes. The method further comprises receiving a memory access request comprising a QoSID. The method also comprises accessing a cache subdivision corresponding to the memory access request among the plurality of cache subdivisions. The method additionally comprises determining whether the QoSID of the memory access request corresponds to the QoS class plurality of QoS classes associated with the cache subdivision. The method further comprises updating a QoSID tracking tag of a plurality of QoSID tracking tags associated with the cache subdivision corresponding to the memory access request based on the determining. The method also comprises generating an approximate usage measurement for the QoS class of the plurality of QoS classes based on the plurality of QoSID tracking tags.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
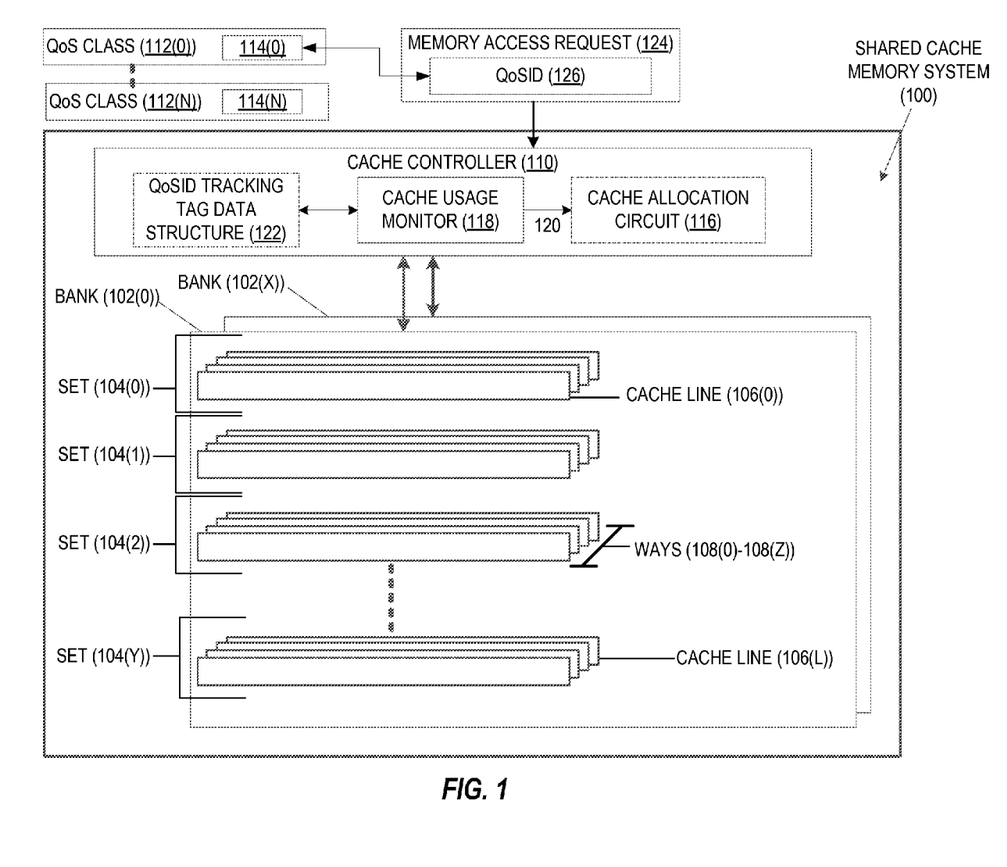
FIG. 1 illustrates an exemplary shared cache memory system including a cache controller comprising a cache usage monitor for generating approximate usage measurements for the shared cache memory system.

In this regard, FIG. 1 is provided to illustrate a structure of a shared cache memory system 100. The shared cache memory system 100 may be provided in a semiconductor die, as a non-limiting example. In some aspects, the shared cache memory system 100 may be a level 1 (L1) cache, a level 2 (L2) cache, or a level 3 (L3) cache, among others, in a hierarchy of memories (not shown). In the example of FIG. 1, the shared cache memory system 100 is a memory array organized into banks 102(0)-102(X). Each of the banks 102(0)-102(X) comprises one or more sets 104(0)-104(Y), with each of the sets 104(0)-104(Y) made up of a subset of cache lines 106(0)-106(L). The number Z of the cache lines 106(0)-106(L) in each of the sets 104(0)-104(Y) is referred to as the "associativity" of the shared cache memory system 100, and the group of cache lines 106(0)-106(L) located at a particular position from 0-Z within each of the sets 104(0)-104(Y) is referred to as a corresponding "way" 108(0)-108(Z). Each way 108(0)-108(Z) may thus be visualized as a vertical "slice" of the cache lines 106(0)-106(L) across all of the sets 104(0)-104(Y).

It is to be understood that aspects described herein are not restricted to any particular arrangement of elements, and the disclosed techniques may be easily extended to various structures and layouts of the shared cache memory system 100. The configuration illustrated in FIG. 1 is for illustrative purposes only. In some aspects, the shared cache memory system 100 may comprise fewer or more banks 102(0)-102(X), fewer or more sets 104(0)-104(Y), fewer or more cache lines 106(0)-106(L), and/or fewer or more ways 108(0)-108(Z) than illustrated herein.

With continued reference to FIG. 1, a cache controller 110 is coupled to each bank 102(0)-102(X). In conventional operation, a requesting agent (not shown), such as an executing software application, may request an instruction or value (not shown) stored at a memory address (not shown). If the requested instruction or value is not found in the shared cache memory system 100, a cache miss results. In response, the cache controller 110 may initiate a cache fill operation, which causes a portion of system memory (not shown) equal to the size of one or more of the cache lines 106(0)-106(L), and containing the requested instruction or value, to be retrieved and stored in one of the cache lines 106(0)-106(L).

The shared cache memory system 100 provides support for multiple QoS classes 112(0)-112(N) for implementing QoS support for shared memory usage. Each of the QoS classes 112(0)-112(N) is associated with a unique QoSID 114(0)-114(N). To more efficiently allocate the cache lines 106(0)-106(L) among multiple requesting agents, the cache controller 110 in some aspects may provide a cache allocation circuit 116. The cache allocation circuit 116 may enable user control of cache resources of the shared cache memory system 100 by associating each of the QoSIDs 114(0)-114(N) with a particular requesting agent, and specifying an allocation of the cache lines 106(0)-106(L) for that QoSID 114(0)-114(N).

By allocating the cache lines 106(0)-106(L) among the QoSIDs 114(0)-114(N) (thus effectively allocating the cache lines 106(0)-106(L) among the corresponding QoS classes 112(0)-112(N)), the shared cache memory system 100 may improve cache performance in a number of use case scenarios. For example, in some aspects, the shared cache memory system 100 may enable real-time constraints to ensure that latency-critical operations carried out by requesting agents have sufficient cache memory to satisfy real-time requirements. To provide service responsive to real-time constraints, the cache allocation circuit 116 may be configured to guarantee that a minimum working set of the cache lines 106(0)-106(L) for a time-critical requesting agent will be preserved in the shared cache memory system 100. Allocation of the cache lines 106(0)-106(L) by the cache allocation circuit 116 may also be useful in enforcing cloud computing Service Level Agreements (SLAB), and/or for restricting the cache allotment of the cache lines 106(0)-106 (L) for certain requesting agents to improve the overall throughput of a computer processing system.

Efficient allocation of the cache lines 106(0)-106(L) among multiple requesting agents involves monitoring the usage of the shared cache memory system 100 by different QoS classes 112(0)-112(N) in order to determine the effects of resource allocation on overall system performance. However, conventional cache memory systems do not provide a space-efficient mechanism for monitoring cache usage. To monitor how many of the cache lines 106(0)-106(L) are used by a given QoS class 112(0)-112(N), the shared cache memory system 100 has the ability to identify those cache lines 106(0)-106(L) that were accessed by each QoS class 112(0)-112(N).

One approach involves tagging each of the cache lines 106(0)-106(L) with the QoSID 114(0)-114(N) of the QoS class 112(0)-112(N) to which the cache lines 106(0)-106(L) are currently allocated. This approach, though, may be prohibitively expensive in terms of storage space within the shared cache memory system 100. For example, in a system that supports a number N of QoS classes 112(0)-112(N), each QoSID 114(0)-114(N) is nominally $\log_2(N)$ bits wide. For example, if the shared cache memory system 100 were 32 megabytes in size, comprising 128-byte lines tagged with 8-bit QoSIDs 114(0)-114(N), the QoSIDs 114(0)-114(N) would account for 256 kilobytes, which may be approximately the size of a conventional L2 cache in some computer processor cores.

In this regard, the shared cache memory system 100 reduces storage overhead by generating approximate usage measurements that are sufficiently accurate for use in determining and monitoring allocation of the cache lines 106(0)-106(L). The shared cache memory system 100 thus provides a cache usage monitor 118 to provide approximate usage measurements, such as approximate usage measurements 120 provided to the cache allocation circuit 116 of the cache controller 110. In some aspects, users (not shown) may query the cache usage monitor 118 using the QoSIDs 114(0)-114(N) to discover an approximation of the current cache usage of the corresponding QoS class 112(0)-112(N). In such aspects, the approximate usage measurements 120 may be provided through a memory-mapped interface (not shown), as a non-limiting example.

To provide space-efficient monitoring of cache usage, the cache usage monitor 118 in some aspects may associate each of a plurality of cache subdivisions of the cache lines 106(0)-106(L) with one of the QoS classes 112(0)-112(N). According to some aspects, the plurality of cache subdivisions may comprise one or more of the cache lines 106(0)-106(L), the sets 104(0)-104(Y) of the cache lines 106(0)-106(L), the ways 108(0)-108(Z) of the cache lines 106(0)-106(L), or the banks 102(0)-102(X) of the cache lines 106(0)-106(L), as non-limiting examples. These exemplary implementations are discussed in greater detail below with respect to FIGS. 2A-2D. Each cache subdivision is also associated with one of a plurality of QoSID tracking tags (not shown), each of which may be used by the cache usage monitor 118 to track whether the cache subdivision is currently being used by the QoS class 112(0)-112(N) with which it is associated. According to some aspects, each of the plurality of QoSID tracking tags may comprise a single bit. In some aspects, the QoS tracking tag may comprise multiple bits, enabling each cache subdivision to be associated with multiple QoS classes 112(0)-112(N). In some aspects, the plurality of QoSID tracking tags may be stored inline with the cache lines 106(0)-106(L), while some aspects may provide that the plurality of QoSID tracking tags are stored in a QoSID tracking tag data structure 122. It is to be understood that, while FIG. 1 illustrates the QoSID tracking tag data structure 122 as located within the cache controller 110, the QoSID tracking tag data structure 122 in some aspects may be located elsewhere within the shared cache memory system 100 (e.g., within the cache usage monitor 118, as a non-limiting example).

Upon receiving a memory access request 124 comprising a QoSID 126, the cache usage monitor 118 accesses the cache subdivision corresponding to the memory access request 124, and determines whether the QoSID 126 of the memory access request 124 corresponds to the QoS class 112(0)-112(N) associated with the cache subdivision. Based on this determination, the cache usage monitor 118 may update the QoSID tracking tag of the cache subdivision corresponding to the memory access request 124. For example, in some aspects providing one-bit QoSID tracking tags, if the QoSID 126 of the memory access request 124 corresponds to the QoS class 112(0)-112(N) associated with the cache subdivision, the cache usage monitor 118 may set the QoSID tracking tag of the cache subdivision to a value of one (1). If the QoSID 126 of the memory access request 124 does not correspond to the QoS class 112(0)-112(N) associated with the cache subdivision, the cache usage monitor 118 may set the QoSID tracking tag of the cache subdivision to a value of zero (0). In this manner, the QoSID tracking tags may be maintained to indicate whether the QoS class 112(0)-112(N) associated with each cache subdivision is actually using that cache subdivision at a given time.

Based on the QoSID tracking tags, the cache usage monitor 118 may generate the approximate usage measurements 120 of the cache lines 106(0)-106(L) for each of the QoS classes 112(0)-112(N). In some aspects, the cache usage monitor 118 may generate the approximate usage measurements 120 by determining a fraction of the plurality of cache subdivisions associated with the QoS class 112(0)-112(N), and further determining a count of the cache subdivisions associated with the QoS class 112(0)-112(N) for which an associated QoSID tracking tag is set. The cache usage monitor 118 may then divide the count of the cache subdivisions by the fraction to generate the approximate usage measurements 120.

As a non-limiting example, assume that the shared cache memory system 100 provides sixteen (16) sets 104(0)-104(15) that represent the cache subdivisions. The sets 104(0)-104(7), or half of the total number of sets 104(0)-104(15), are associated with the QoS class 112(0) for measurement purposes, while the sets 104(8)-104(15) are associated with the QoS class 112(N) for measurement purposes. Thus, the fraction of the plurality of cache subdivisions associated with each of the QoS classes 112(0) and 112(1), for instance, is ½, or 0.5. Assume further that six (6) of the sets 104(0)-104(5) that are associated with the QoS class 112(0) have an associated QoSID tracking tag that is set. Accordingly, the cache usage monitor 118 may generate an approximate usage measurement 120 that estimates that twelve (12) (i.e., six (6) divided by 0.5) of the sets 104(0)-104(15) are currently in use by the QoS class 112(0).

In some aspects, the cache usage monitor 118 may improve its accuracy by associating the cache subdivisions only with active QoS classes 112(0)-112(N), rather than associating the cache subdivisions with a fixed maximum number of QoS classes 112(0)-112(N). For example, if only one QoS class 112(0) is active, the active QoS class 112(0) may be associated with every cache line 106(0)-106(L) in the shared cache memory system 100, resulting in the approximate usage measurements 120 having zero error. Some aspects may provide that, in addition to reducing the number of bits needed to identify a QoS class 112(0)-112(N), the cache usage monitor 118 may also employ conventional sampling methods. As a non-limiting example, the QoSID tracking tags may be associated only with a distributed subset of the cache subdivisions.

The approximation techniques may be combined in some aspects to provide a configuration of the shared cache memory system 100 having an acceptable tradeoff between overhead and accuracy for a given application. The storage requirements for combinations provided in some aspects are illustrated in Table 1 below. In Table 1, the total storage, in bytes, required by various configurations is indicated. Each entry is calculated based on an 8 megabyte, 16-way, 128-byte-line, 4-bank cache, and a system that supports a maximum of 32 QoSIDs. The number in parentheses is the percentage of the relative overhead needed to fully and precisely track which cache line is appended with a 5-bit QoSID.

TABLE 1

| | |
|---|---|
| Full tracking | 40960 bytes (100%) |
| Sample 256 sets per bank | 10240 bytes (25%) |
| Sample 4 ways per set | 10240 bytes (25%) |
| 1 QoSID bit per line | 8192 bytes (20%) |
| Sample 128 sets per bank | 5120 bytes (12.5%) |
| Sample 2 ways per set | 5120 bytes (12.5%) |
| Sample 512 sets per bank, 8 ways per sampled set, and 1 QoSID bit per sampled line | 2048 bytes (5%) |
| Sample 256 sets per bank, 8 ways per sampled set, and 1 QoSID bit per sampled line | 2048 bytes (2.5%) |
| Sample 128 sets per bank, 8 ways per sampled set, and 1 QoSID bit per sampled line | 2048 bytes (1.25%) |

Figure 2A:
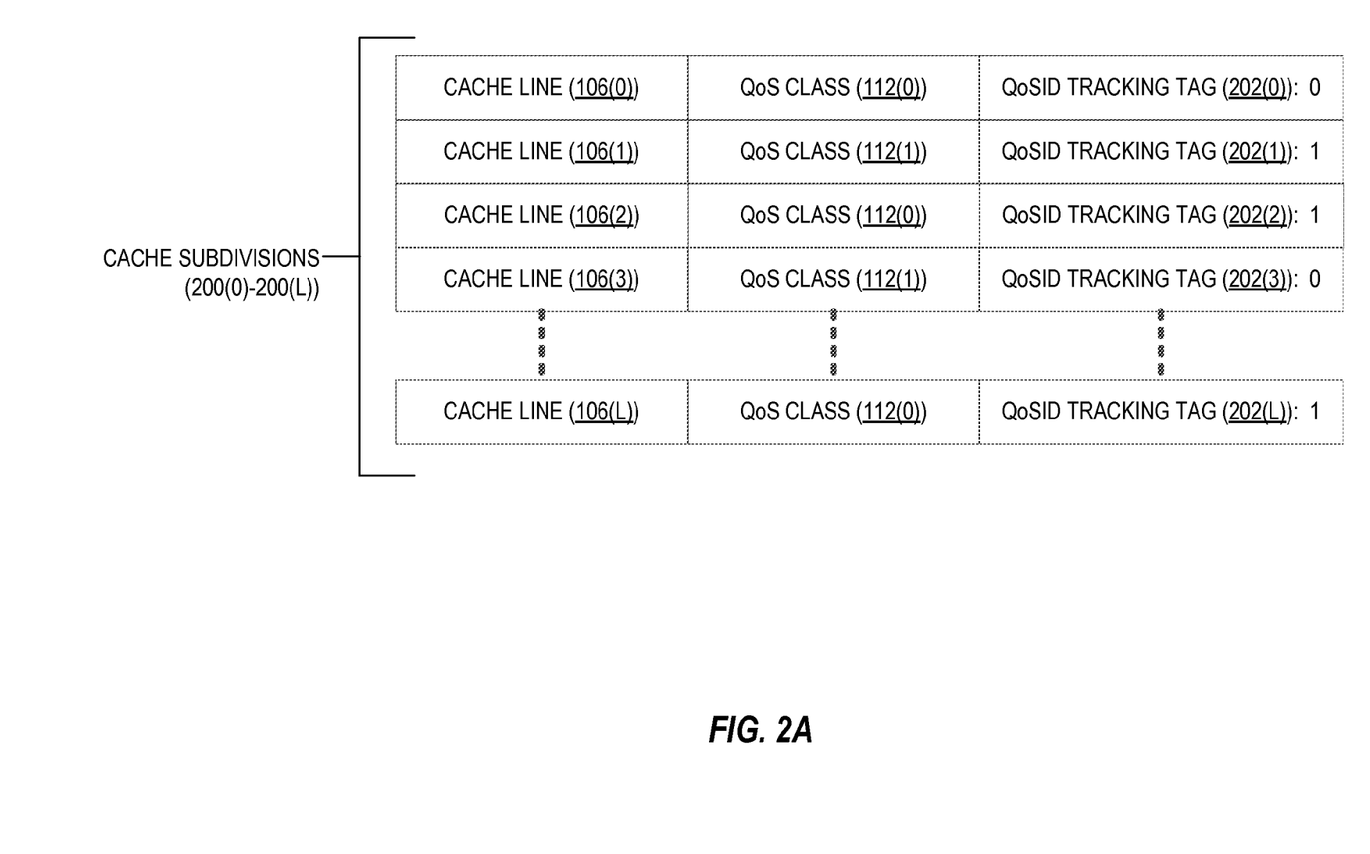
FIGS. 2A-2D illustrate exemplary shared cache memory system implementations wherein Quality of Service (QoS) classes and QoS identifier (QoSID) tracking tags are associated with cache subdivisions comprising cache lines, sets of cache lines, and banks of cache lines, respectively.

As noted above, in some aspects, the cache subdivisions may comprise one or more of the cache lines 106(0)-106(L), the sets 104(0)-104(Y) of the cache lines 106(0)-106(L), the ways 108(0)-108(Z) of the cache lines 106(0)-106(L), or the banks 102(0)-102(X) of the cache lines 106(0)-106(L). In this regard, FIGS. 2A-2D are provided to illustrate exemplary aspects providing cache subdivisions 200(0)-200(L), 200(0)-200(Y), 200(0)-200(Z), 200(0)-200(X) comprising the cache lines 106(0)-106(L), the sets 104(0)-104(Y) of the cache lines 106(0)-106(L), the ways 108(0)-108(Z) of the cache lines 106(0)-106(L), and the banks 102(0)-102(X) of the cache lines 106(0)-106(L), respectively. In FIG. 2A, the cache subdivisions 200(0)-200(L) each correspond to one of the cache lines 106(0)-106(L), with the cache lines 106(0), 106(2), and 106(L) associated with QoS class 112(0) and the cache lines 106(1), 106(3) associated with QoS class 112(1). Each of the cache subdivisions 200(0)-200(L) is also associated with a corresponding QoSID tracking tag 202(0)-202(L), comprising a single bit. The QoSID tracking tags 202(0)-202(L) indicate that the cache line 106(1) is currently in use by the associated QoS class 112(1), while the cache lines 106(2) and 106(L) are currently in use by the associated QoS class 112(0). Likewise, the QoSID tracking tag 202(0) indicates that the cache line 106(0) is not presently in use by the associated QoS class 112(0), and the QoSID tracking tag 202(3) indicates that the cache line 106(3) is not presently in use by the associated QoS class 112(1).

Figure 2B:
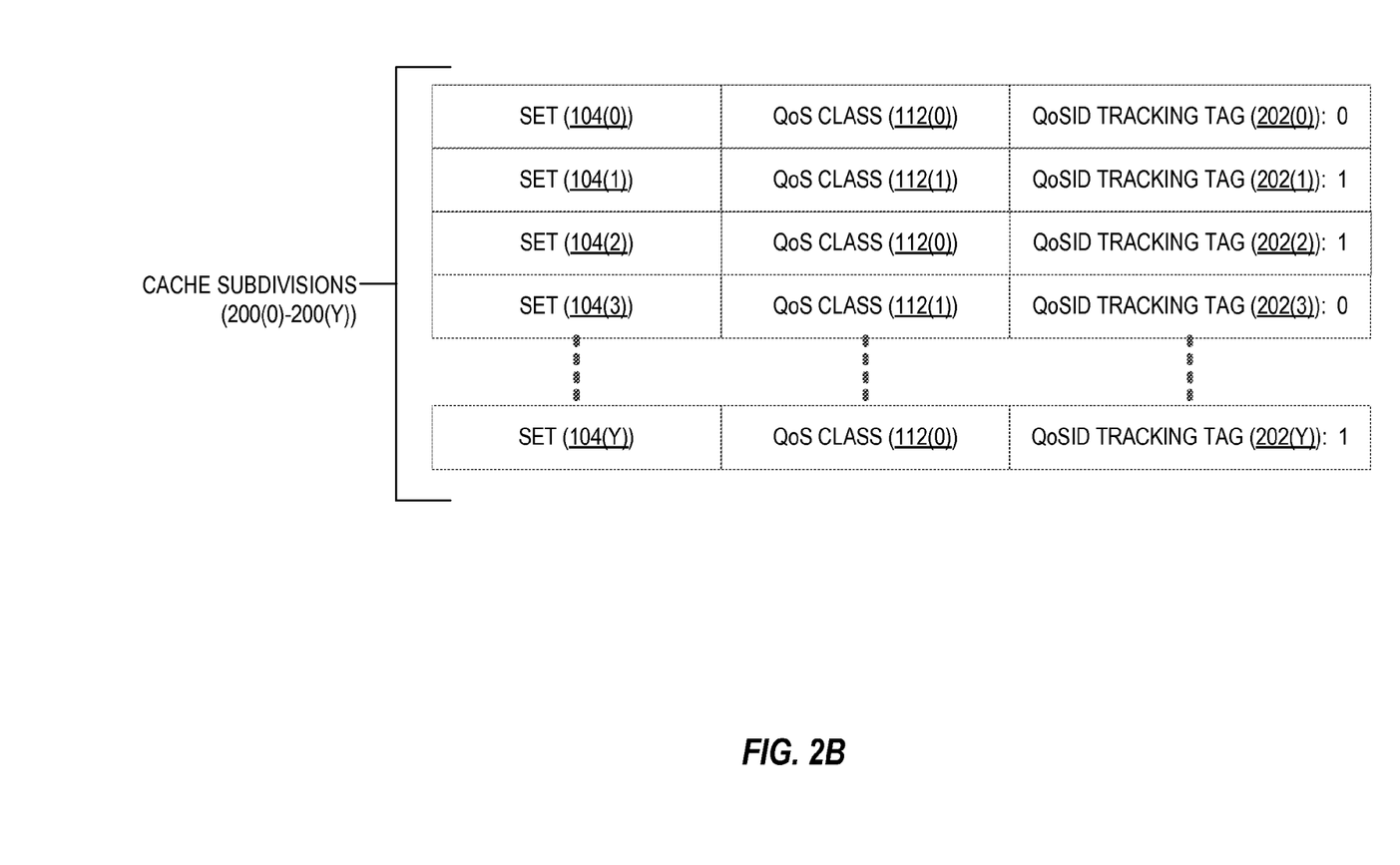

In the example of FIG. 2B, the cache subdivisions 200(0)-200(Y) each correspond to one of the sets 104(0)-104(Y) of the cache lines 106(0)-106(L). The sets 104(0), 104(2), and 104(Y) are associated with QoS class 112(0), while the sets 104(1), 104(3) are associated with QoS class 112(1). The QoSID tracking tags 202(0)-202(Y) associated with the cache subdivisions 200(0)-200(Y) indicate that the set 104(1) is currently in use by the associated QoS class 112(1), while the sets 104(2) and 104(Y) are currently in use by the associated QoS class 112(0). Similarly, the QoSID tracking tag 202(0) indicates that the set 104(0) is not presently in use by the associated QoS class 112(0), and the QoSID tracking tag 202(3) indicates that the set 104(3) is not presently in use by the associated QoS class 112(1).

Figure 2C:
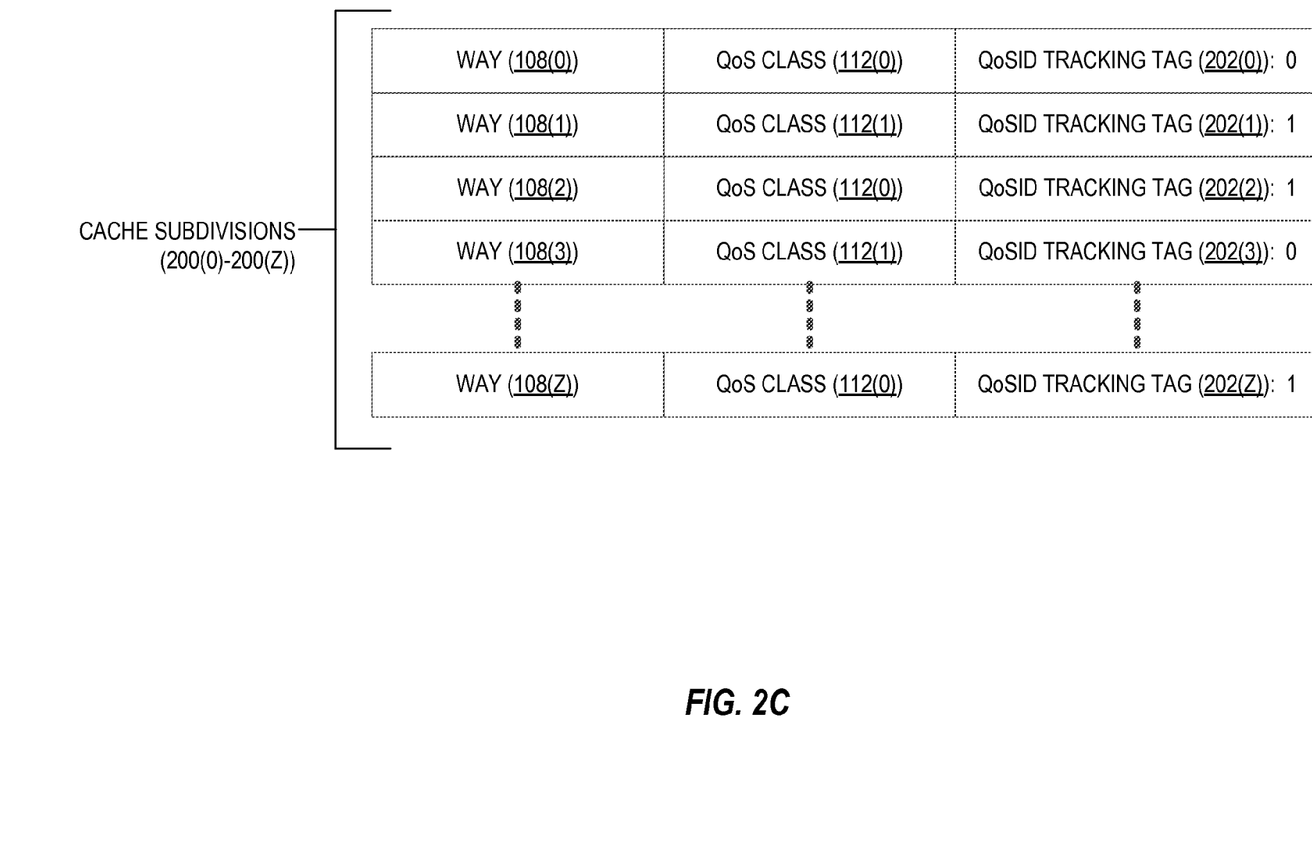

In FIG. 2C, the cache subdivisions 200(0)-200(Z) each correspond to one of the ways 108(0)-108(Z) of the cache lines 106(0)-106(L). The ways 108(0), 108(2), and 108(Z) are associated with QoS class 112(0), while the ways 108(1), 108(3) are associated with QoS class 112(1). The QoSID tracking tags 202(0)-202(Z) associated with the cache subdivisions 200(0)-200(Z) indicate that the way 108(1) is currently in use by the associated QoS class 112(1), while the ways 108(2) and 108(Z) are currently in use by the associated QoS class 112(0). Likewise, the QoSID tracking tag 202(0) indicates that the way 108(0) is not presently in use by the associated QoS class 112(0), and the QoSID tracking tag 202(3) indicates that the way 108(3) is not presently in use by the associated QoS class 112(1).

Figure 2D:
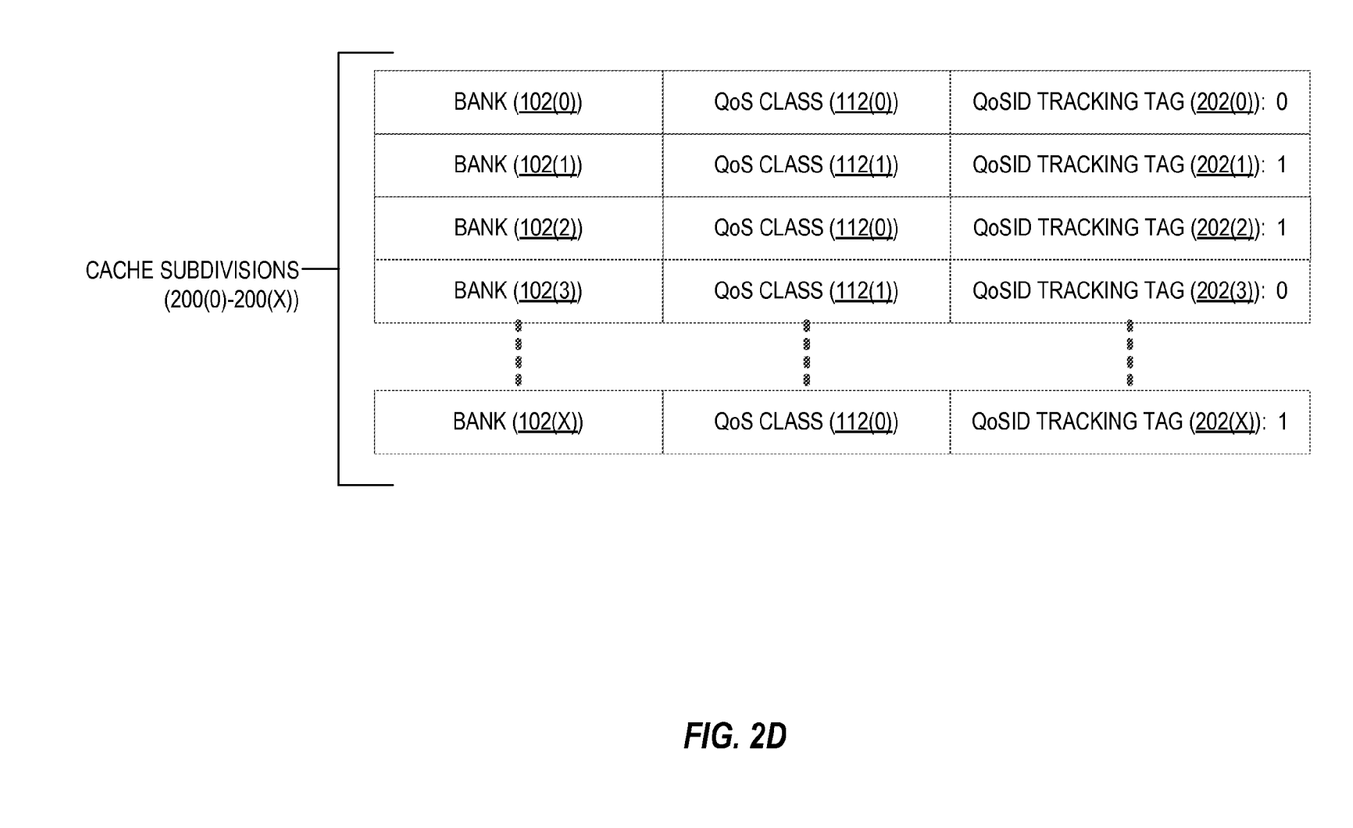

Referring now to FIG. 2D, the cache subdivisions 200(0)-200(X) in this example each correspond to one of the banks 102(0)-102(X) of the cache lines 106(0)-106(L). The banks 102(0), 102(2), and 102(X) are associated with QoS class 112(0), while the banks 102(1), 102(3) are associated with QoS class 112(1). In this example, the QoSID tracking tags 202(0)-202(X) associated with the cache subdivisions 200(0)-200(X) indicate that the bank 102(1) is currently in use by the associated QoS class 112(1), while the banks 102(2) and 102(X) are currently in use by the associated QoS class 112(0). Similarly, the QoSID tracking tag 202(0) indicates that the bank 102(0) is not presently in use by the associated QoS class 112(0), and the QoSID tracking tag 202(3) indicates that the bank 102(3) is not presently in use by the associated QoS class 112(1).

Figure 3A:
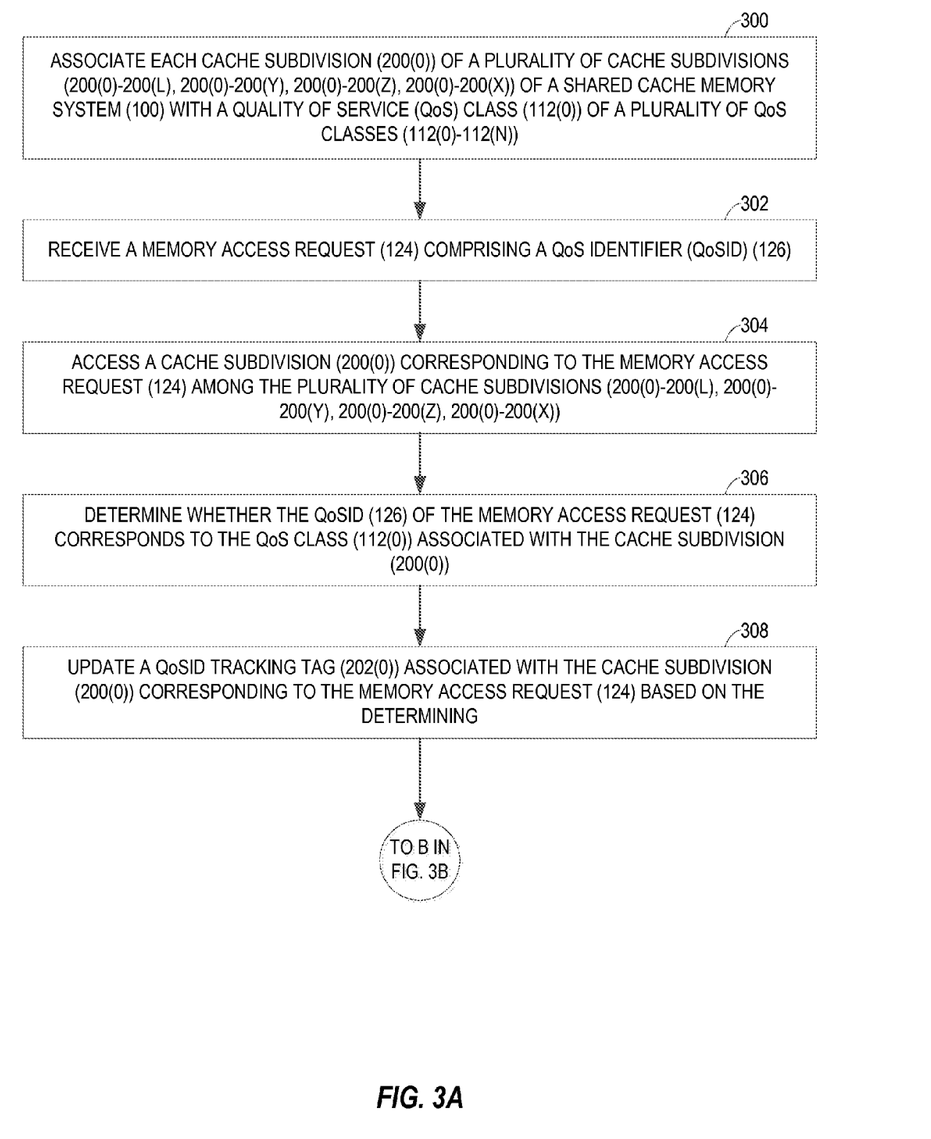
FIGS. 3A and 3B illustrate exemplary operations of the shared cache memory system of FIG. 1 for generating approximate usage measurements for the shared cache memory system.
Figure 3B:
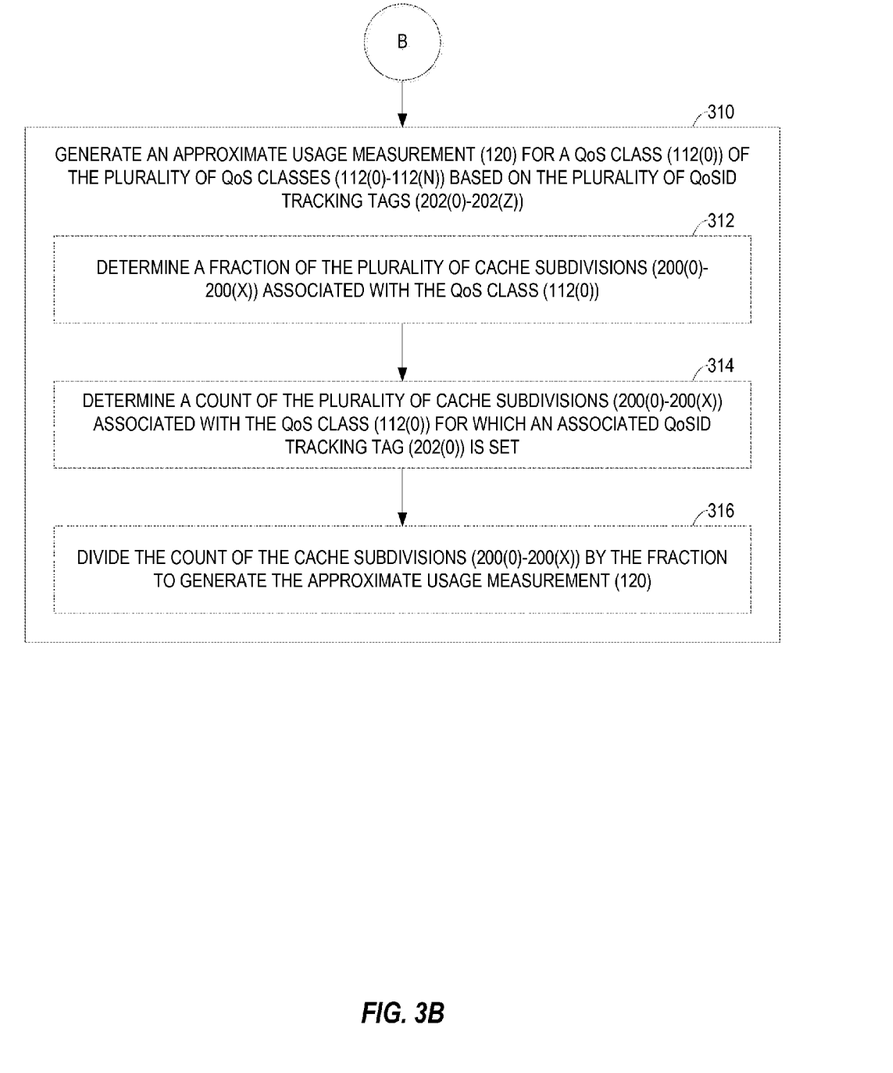

To illustrate exemplary operations of the shared cache memory system 100 of FIG. 1 for generating the approximate usage measurements 120, FIGS. 3A-3B are provided. In describing FIGS. 3A-3B, elements of FIGS. 1 and 2A-2D are referenced for the sake of clarity. In FIG. 3A, operations begin with the cache usage monitor 118 of FIG. 1 associating each cache subdivision 200(0) of the plurality of cache subdivisions (e.g., cache subdivisions 200(0)-200(L), 200(0)-200(Y), 200(0)-200(Z), 200(0)-200(X)) of the shared cache memory system 100 with a QoS class 112(0) of a plurality of QoS classes 112(0)-112(N) (block 300). In this regard, the cache usage monitor 118 may be referred to herein as "a means for associating each cache subdivision of a plurality of cache subdivisions of the shared cache memory system with a QoS class of a plurality of QoS classes."

The cache usage monitor 118 next receives a memory access request 124 comprising a QoSID 126 (block 302). Accordingly, the cache usage monitor 118 may be referred to herein as "a means for receiving a memory access request comprising a QoSID." The cache usage monitor 118 accesses a cache subdivision 200(0) corresponding to the memory access request 124 among the plurality of cache subdivisions 200(0)-200(L), 200(0)-200(Y), 200(0)-200(Z), 200(0)-200(X) (block 304). The cache usage monitor 118 may thus be referred to herein as "a means for accessing a cache subdivision corresponding to the memory access request among the plurality of cache subdivisions."

With continued reference to FIG. 3A, the cache usage monitor 118 determines whether the QoSID 126 of the memory access request 124 corresponds to the QoS class 112(0) associated with the cache subdivision 200(0) (block 306). In this regard, the cache usage monitor 118 may be referred to herein as "a means for determining whether the QoSID of the memory access request corresponds to the QoS class plurality of QoS classes associated with the cache subdivision." Based on the determining, the cache usage monitor 118 updates the QoSID tracking tag 202(0) associated with the cache subdivision 200(0) corresponding to the memory access request 124 based on the determining (block 308). Accordingly, the cache usage monitor 118 may be referred to herein as "a means for updating a QoSID tracking tag of a plurality of QoSID tracking tags associated with the cache subdivision corresponding to the memory access request based on the means for determining." Processing then resumes at block 310 of FIG. 3B.

Turning now to FIG. 3B, the cache usage monitor 118 generates an approximate usage measurement 120 for a QoS class 112(0) of the plurality of QoS classes 112(0)-112(Z) based on the plurality of QoSID tracking tags 202(0)-202(N) (block 310). The cache usage monitor 118 may thus be referred to herein as "a means for generating an approximate usage measurement for the QoS class of the plurality of QoS classes based on the plurality of QoSID tracking tags." In some aspects, operations of block 310 for generating the approximate usage measurement 120 may include the cache usage monitor 118 first determining a fraction of the plurality of cache subdivisions 200(0)-200(X) associated with the QoS class 112(0) (block 312). In this regard, the cache usage monitor 118 may be referred to herein as "a means for determining a fraction of the plurality of cache subdivisions associated with the QoS class." The cache usage monitor 118 may next determine a count of the plurality of cache subdivisions 200(0)-200(X) associated with the QoS class 112(0) for which an associated QoSID tracking tag 202(0) is set (block 314). Accordingly, the cache usage monitor 118 may be referred to herein as "a means for determining a count of the plurality of cache subdivisions associated with the QoS class for which the associated QoSID tracking tag is set." The cache usage monitor 118 may then divide the count of the cache subdivisions 200(0)-200(X) by the fraction to generate the approximate usage measurement 120 (block 316). The cache usage monitor 118 may thus be referred to herein as "a means for dividing the count of the plurality of cache subdivisions by the fraction to generate the approximate usage measurement."

Generating approximate usage measurements for shared cache memory systems may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 4:
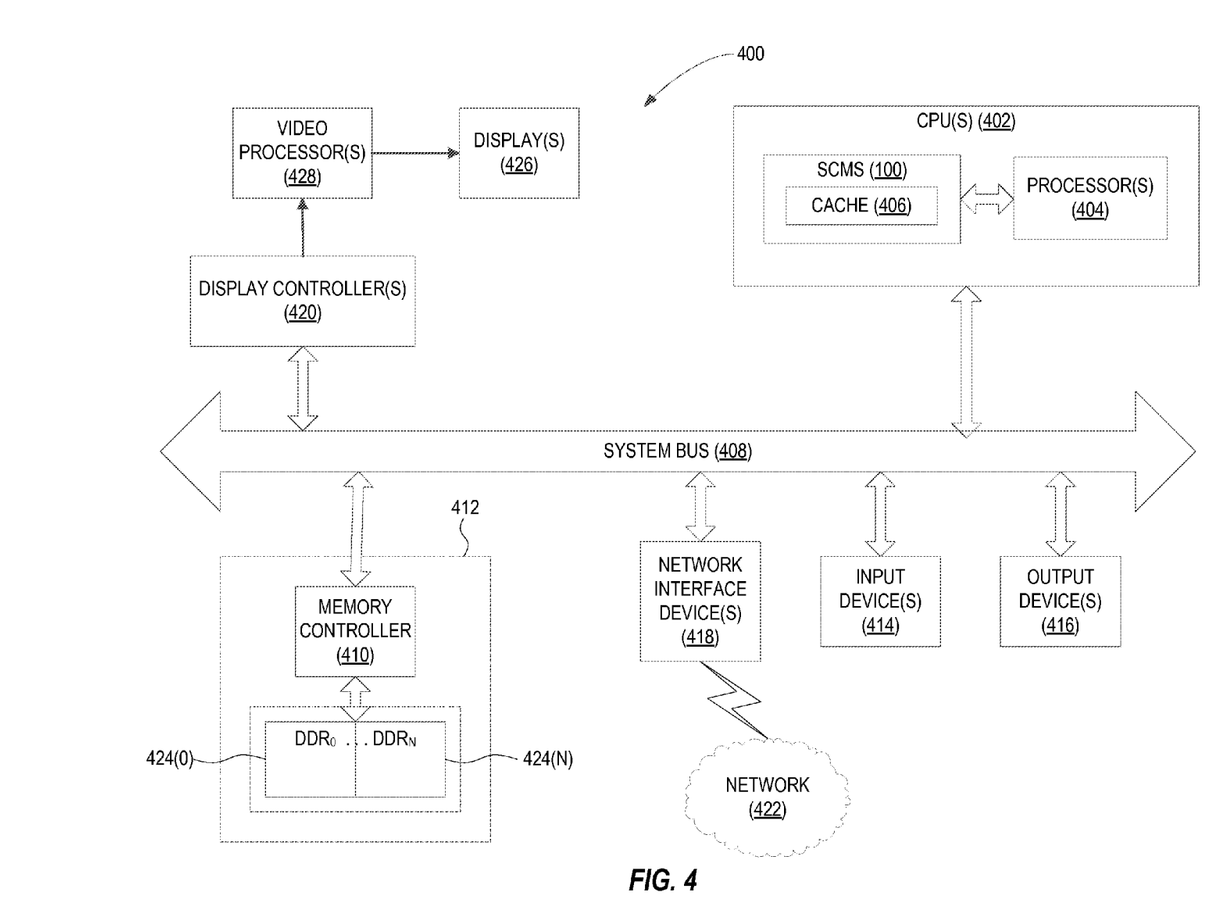
FIG. 4 is a block diagram of an exemplary processor-based system that can include the shared cache memory system of FIG. 1 to provide approximate usage measurements.

In this regard, FIG. 4 is a block diagram of an exemplary processor-based system 400 that can include the shared cache memory system (SCMS) 100 having the cache controller 110 of FIG. 1. In this example, the processor-based system 400 includes one or more CPUs 402, each including one or more processors 404. The CPU(s) 402 may be a master device. The CPU(s) 402 may have cache memory 406 coupled to the processor(s) 404 for rapid access to temporarily stored data. In some aspects, the cache memory 406 may comprise the shared cache memory system 100 and/or the cache controller 110 of FIG. 1. The CPU(s) 402 is coupled to a system bus 408 and can intercouple master and slave devices included in the processor-based system 400. As is well known, the CPU(s) 402 communicates with these other devices by exchanging address, control, and data information over the system bus 408. For example, the CPU(s) 402 can communicate bus transaction requests to a memory controller 410 as an example of a slave device.

Other master and slave devices can be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including but not limited to input keys, switches, voice processors, etc. The output device(s) 416 can include any type of output device, including but not limited to audio, video, other visual indicators, etc. The network interface device(s) 418 can be any devices configured to allow exchange of data to and from a network 422. The network 422 can be any type of network, including but not limited to a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include one or more memory units 424(0)-424(N).

The CPU(s) 402 may also be configured to access the display controller(s) 420 over the system bus 408 to control information sent to one or more displays 426. The display controller(s) 420 sends information to the display(s) 426 to be displayed via one or more video processors 428, which process the information to be displayed into a format suitable for the display(s) 426. The display(s) 426 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A shared cache memory system, comprising:
   a plurality of cache subdivisions;
   a plurality of Quality of Service identifier (QoSID) tracking tags each associated with a cache subdivision of the plurality of cache subdivisions; and
   a cache usage monitor configured to:
      associate each cache subdivision of the plurality of cache subdivisions with a QoS class of a plurality of QoS classes;
      receive a memory access request comprising a QoSID;
      access a cache subdivision corresponding to the memory access request among the plurality of cache subdivisions;
      determine whether the QoSID of the memory access request corresponds to the QoS class associated with the cache subdivision;
      update a QoSID tracking tag of the plurality of QoSID tracking tags associated with the cache subdivision corresponding to the memory access request based on the determination; and
      generate an approximate usage measurement for the QoS class of the plurality of QoS classes based on the plurality of QoSID tracking tags;
   wherein the cache usage monitor is configured to generate the approximate usage measurement for the QoS class of the plurality of QoS classes based on the plurality of OoSID tracking tags by being configured to:
      determine a fraction of the plurality of cache subdivisions associated with the QoS class:
      determine a count of the plurality of cache subdivisions associated with the QoS class for which the associated plurality of QoSID tracking tags is set: and
      divide the count of the plurality of cache subdivisions by the fraction to generate the approximate usage measurement.

2. The shared cache memory system of claim 1, wherein each cache subdivision of the plurality of cache subdivisions comprises a cache line.

3. The shared cache memory system of claim 1, wherein each cache subdivision of the plurality of cache subdivisions comprises a set of cache lines.

4. The shared cache memory system of claim 1, wherein each cache subdivision of the plurality of cache subdivisions comprises a way of cache lines.

5. The shared cache memory system of claim 1, wherein each cache subdivision of the plurality of cache subdivisions comprises a bank of cache lines.

6. The shared cache memory system of claim 1, wherein the plurality of QoSID tracking tags are associated with a distributed subset of the plurality of cache subdivisions.

7. The shared cache memory system of claim 1 integrated into an integrated circuit (IC).

8. The shared cache memory system of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

9. A shared cache memory system, comprising:
   a means for associating each cache subdivision of a plurality of cache subdivisions of the shared cache memory system with a Quality of Service (QoS) class of a plurality of QoS classes;
   a means for receiving a memory access request comprising a QoS identifier (QoSID);
   a means for accessing a cache subdivision corresponding to the memory access request among the plurality of cache subdivisions;
   a means for determining whether the QoSID of the memory access request corresponds to the QoS class plurality of QoS classes associated with the cache subdivision;
   a means for updating a QoSID tracking tag of a plurality of QoSID tracking tags associated with the cache subdivision corresponding to the memory access request based on the means for determining; and
   a means for generating an approximate usage measurement for the QoS class of the plurality of QoS classes based on the plurality of QoSID tracking tags;
   wherein the means for generating the approximate usage measurement for the QoS class of the plurality of QoS classes based on the plurality of QoSID tracking tags comprises:
      a means for determining a fraction of the plurality of cache subdivisions associated with the QoS class;
      a means for determining a count of the plurality of cache subdivisions associated with the QoS class for which the associated QoSID tracking tag is set; and
      a means for dividing the count of the plurality of cache subdivisions by the fraction to generate the approximate usage measurement.

10. The shared cache memory system of claim 9, wherein each cache subdivision of the plurality of cache subdivisions comprises a cache line.

11. The shared cache memory system of claim 9, wherein each cache subdivision of the plurality of cache subdivisions comprises a set of cache lines.

12. The shared cache memory system of claim 9, wherein each cache subdivision of the plurality of cache subdivisions comprises a way of cache lines.

13. The shared cache memory system of claim 9, wherein each cache subdivision of the plurality of cache subdivisions comprises a bank of cache lines.

14. The shared cache memory system of claim 9, wherein the plurality of QoSID tracking tags are associated with a distributed subset of the plurality of cache subdivisions.

15. A method for approximating shared cache memory usage, comprising:
  associating each cache subdivision of a plurality of cache subdivisions of a shared cache memory system with a Quality of Service (QoS) class of a plurality of QoS classes;
  receiving a memory access request comprising a QoS identifier (QoSID);
  accessing a cache subdivision corresponding to the memory access request among the plurality of cache subdivisions;
  determining whether the QoSID of the memory access request corresponds to the QoS class of the plurality of QoS classes associated with the cache subdivision;
  updating a QoSID tracking tag of a plurality of QoSID tracking tags associated with the cache subdivision corresponding to the memory access request based on the determining; and
  generating an approximate usage measurement for the QoS class of the plurality of QoS classes based on the plurality of QoSID tracking tags;
  wherein generating the approximate usage measurement for the QoS class of the plurality of QoS classes based on the plurality of QoSID tracking tags comprises:
    determining a fraction of the plurality of cache subdivisions associated with the QoS class;
    determining a count of the plurality of cache subdivisions associated with the QoS class for which the associated QoSID tracking tag is set; and
    dividing the count of the plurality of cache subdivisions by the fraction to generate the approximate usage measurement.

16. The method of claim 15, wherein each cache subdivision of the plurality of cache subdivisions comprises a cache line.

17. The method of claim 15, wherein each cache subdivision of the plurality of cache subdivisions comprises a set of cache lines.

18. The method of claim 15, wherein each cache subdivision of the plurality of cache subdivisions comprises a way of cache lines.

19. The method of claim 15, wherein each cache subdivision of the plurality of cache subdivisions comprises a bank of cache lines.

20. The method of claim 15, wherein the plurality of QoSID tracking tags are associated with a distributed subset of the plurality of cache subdivisions.

* * * * *

UNITED STATES PATENT AND TRADEMARK OFFICE
CERTIFICATE OF CORRECTION

PATENT NO. : 9,697,126 B2  
APPLICATION NO. : 14/860993  
DATED : September 22, 2015  
INVENTOR(S) : Derek Robert Hower et al.

Page 1 of 1

It is certified that error appears in the above-identified patent and that said Letters Patent is hereby corrected as shown below:

At Column 11, Line 62, change "OoSID" to --QoSID--.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*